US006405570B1

(12) United States Patent

Middleton et al.

(10) Patent No.: US 6,405,570 B1
(45) Date of Patent: Jun. 18, 2002

(54) ANTI-THEFT DEVICE

(76) Inventors: Richard A. Middleton; Vicky L. Middleton, both of 4520 Renner Rd, Waldorf, MD (US) 20602

( * ) Notice: Subject to any disclaimer, the term of this patent is extended or adjusted under 35 U.S.C. 154(b) by 0 days.

(21) Appl. No.: 09/574,526

(22) Filed: May 19, 2000

(51) Int. Cl.[7] ................................................ F16C 3/00

(52) U.S. Cl. ............................................ 70/174; 70/56

(58) Field of Search .......................... 70/174, 158–169; 292/338–339; 16/49; 180/287; 414/722

(56) References Cited

U.S. PATENT DOCUMENTS 2,397,516 A 4/1946 Stewart
3,135,555 A 6/1964 Caskey
4,373,851 A 2/1983 Confoey
4,417,644 A 11/1983 Brogard
4,813,100 A * 3/1989 King ............................ 16/49
D301,832 S 6/1989 Hathaway
4,866,960 A * 9/1989 Brower .......................... 70/56
5,575,513 A 11/1996 Tuttle
5,735,146 A * 4/1998 Taplin ........................... 70/56
5,737,946 A * 4/1998 Sole et al. .................. 70/56 X
5,743,118 A * 4/1998 Anderson ...................... 70/56
5,836,184 A * 11/1998 Brown ........................ 70/178
5,845,521 A * 12/1998 Najera ........................... 70/56
6,000,250 A * 12/1999 Daoud ........................... 70/56

* cited by examiner

*Primary Examiner*—Suzanne Dino Barrett

(57) ABSTRACT

A anti-theft device for removably placing around the cylinder of a stabilizer leg of heavy machinery such that the cylinder may not be retracted. The anti-theft device includes a shaft. The shaft is elongate and has a first and second end. The shaft is hollow such that the shaft has an inner surface and an outer surface. Each of the first and second ends is open. The shaft is divided into two substantially equal portions along a line orientated generally parallel to a longitudinal axis of the shaft. Each of the portions has a pair of free edges. A first free edge of a first portion is hingedly coupled to a first free edge of the second portion such that the second free edges are abuttable. A closed position is defined by the second free edges being abutted. A latching means coupled to the shaft removably latches the first portion to the second portion in the closed position.

6 Claims, 3 Drawing Sheets

FIG 1
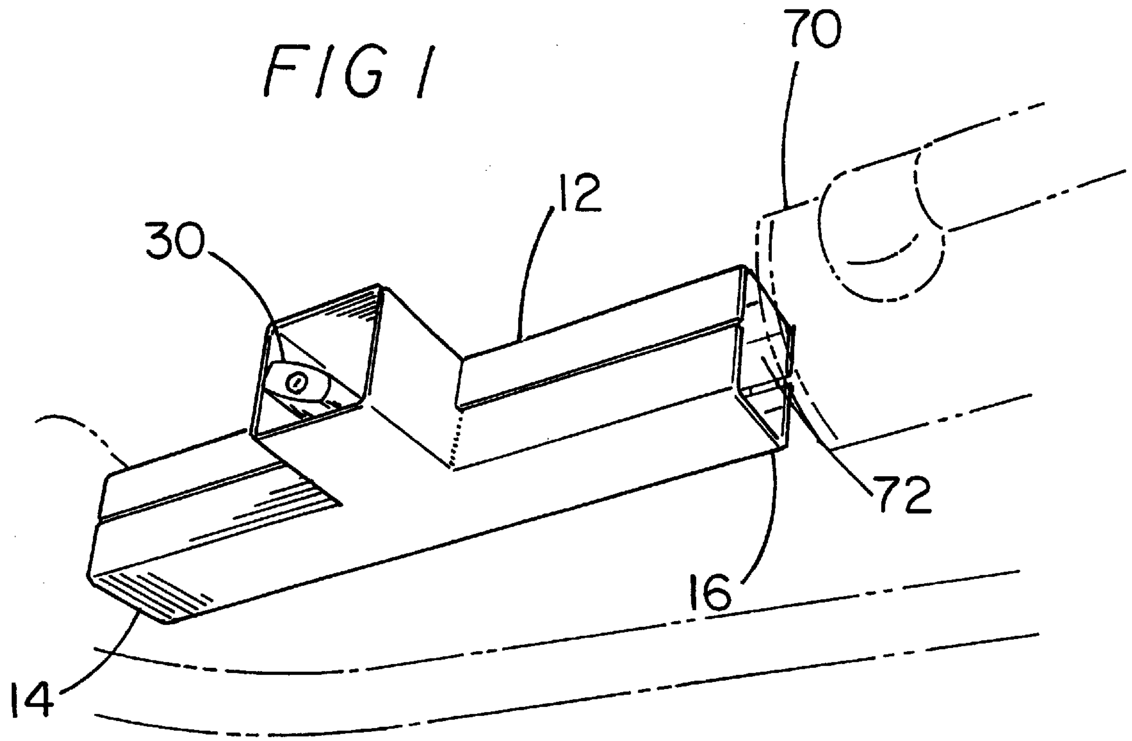
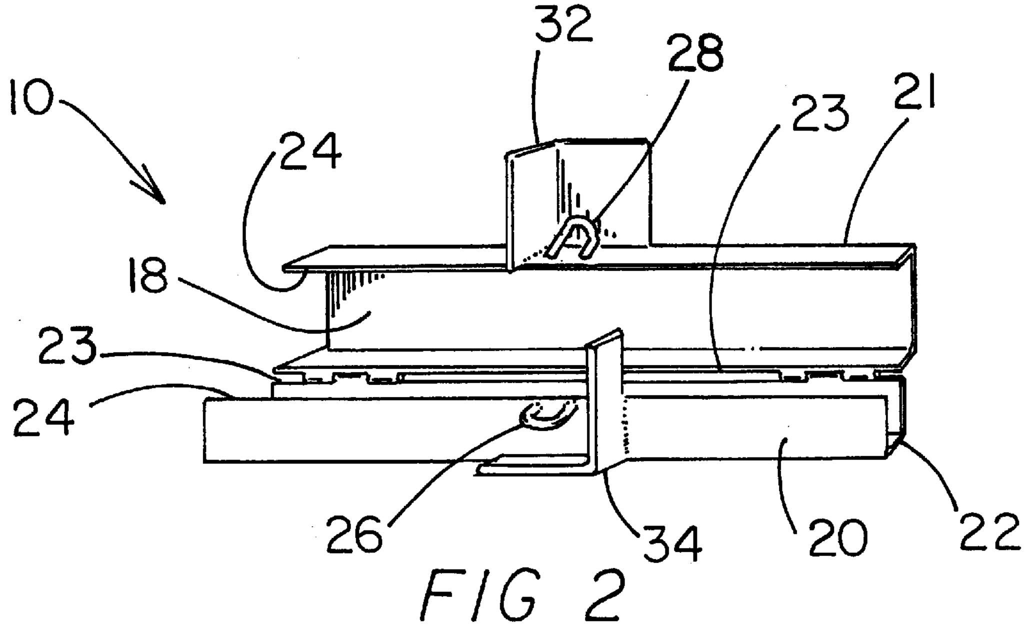
FIG 2

ANTI-THEFT DEVICE

BACKGROUND OF THE INVENTION

1. Field of the Invention

The present invention relates to anti-theft devices and more particularly pertains to a new anti-theft device for removably placing around the cylinder of a stabilizer leg of heavy machinery such that the cylinder may not be retracted.

2. Description of the Prior Art

The use of anti-theft devices is known in the prior art. More specifically, anti-theft devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,417,644; 4,373,851; 5,575,513; 2,397,516; 3,135,555; and U.S. Des. Pat. No. 301,832.

While these devices fulfill their respective, particular objectives and requirements, the aforementioned patents do not disclose a new anti-theft device. The inventive device includes a shaft. The shaft is elongate and has a first and second end. The shaft is hollow such that the shaft has an inner surface and an outer surface. Each of the first and second ends is open. The shaft is divided into two substantially equal portions along a line orientated generally parallel to a longitudinal axis of the shaft. Each of the portions has a pair of free edges. A first free edge of a first portion is hingedly coupled to a first free edge of the second portion such that the second free edges are abuttable. A closed position is defined by the second free edges being abutted. A latching means coupled to the shaft removably latches the first portion to the second portion in the closed position.

In these respects, the anti-theft device according to the present invention substantially departs from the conventional concepts and designs of the prior art, and in so doing provides an apparatus primarily developed for the purpose of removably placing around the cylinder of a stabilizer leg of heavy machinery such that the cylinder may not be retracted.

SUMMARY OF THE INVENTION

In view of the foregoing disadvantages inherent in the known types of anti-theft devices now present in the prior art, the present invention provides a new anti-theft device construction wherein the same can be utilized for removably placing around the cylinder of a stabilizer leg of heavy machinery such that the cylinder may not be retracted.

The general purpose of the present invention, which will be described subsequently in greater detail, is to provide a new anti-theft device apparatus and method which has many of the advantages of the anti-theft devices mentioned heretofore and many novel features that result in a new anti-theft device which is not anticipated, rendered obvious, suggested, or even implied by any of the prior art anti-theft devices, either alone or in any combination thereof.

To attain this, the present invention generally comprises a shaft. The shaft is elongate and has a first and second end. The shaft is hollow such that the shaft has an inner surface and an outer surface. Each of the first and second ends is open. The shaft is divided into two substantially equal portions along a line orientated generally parallel to a longitudinal axis of the shaft. Each of the portions has a pair of free edges. A first free edge of a first portion is hingedly coupled to a first free edge of the second portion such that the second free edges are abuttable. A closed position is defined by the second free edges being abutted. A latching means coupled to the shaft removably latches the first portion to the second portion in the closed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new anti-theft device apparatus and method which has many of the advantages of the anti-theft devices mentioned heretofore and many novel features that result in a new anti-theft device which is not anticipated, rendered obvious, suggested, or even implied by any of the prior art anti-theft devices, either alone or in any combination thereof.

It is another object of the present invention to provide a new anti-theft device which may be easily and efficiently manufactured and marketed.

It is a further object of the present invention to provide a new anti-theft device which is of a durable and reliable construction.

An even further object of the present invention is to provide a new anti-theft device which is susceptible of a low cost of manufacture with regard to both materials and labor, and which accordingly is then susceptible of low prices of sale to the consuming public, thereby making such anti-theft device economically available to the buying public.

Still yet another object of the present invention is to provide a new anti-theft device which provides in the apparatuses and methods of the prior art some of the advantages thereof, while simultaneously overcoming some of the disadvantages normally associated therewith.

Still another object of the present invention is to provide a new anti-theft device for removably placing around the cylinder of a stabilizer leg of heavy machinery such that the cylinder may not be retracted.

Yet another object of the present invention is to provide a new anti-theft device which includes a shaft. The shaft is elongate and has a first and second end. The shaft is hollow such that the shaft has an inner surface and an outer surface. Each of the first and second ends is open. The shaft is divided into two substantially equal portions along a line orientated generally parallel to a longitudinal axis of the shaft. Each of the portions has a pair of free edges. A first free edge of a first portion is hingedly coupled to a first free edge of the second portion such that the second free edges are abuttable. A closed position is defined by the second free edges being abutted. A latching means coupled to the shaft removably latches the first portion to the second portion in the closed position.

Still yet another object of the present invention is to provide a new anti-theft device that is retrofittable to heavy machinery.

Even still another object of the present invention is to provide a new anti-theft device that has shield walls for preventing tampering with the locking means.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new anti-theft device according to the present invention.

FIG. 2 is a schematic perspective view of the present invention.

DESCRIPTION OF THE PREFERRED EMBODIMENT

Figure 3:
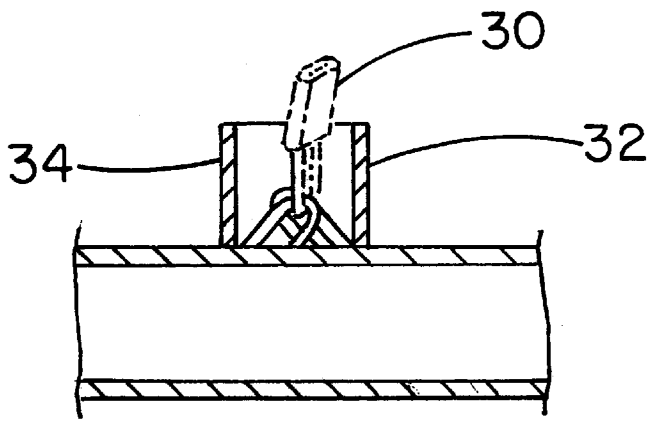
FIG. 3 is a schematic cross-sectional view of the present invention.

With reference now to the drawings, and in particular to FIGS. 1 through 4 thereof, a new anti-theft device embodying the principles and concepts of the present invention and generally designated by the reference numeral 10 will be described.

As best illustrated in FIGS. 1 through 6, the anti-theft device 10 generally comprises a device which is removably coupled around an extended cylinder 72 of a stabilizing leg 70 of the machinery such that the stabilizing leg may not be retracted. If the leg is not retracted, the wheels on the machinery may not utilized in order to steal the machinery.

The device is a shaft 12. The shaft is elongate and has a first 14 and second 16 end. The shaft 12 is hollow such that the shaft has an inner surface 18 and an outer surface 20. Each of the first and second ends is open. The shaft 12 is divided into two substantially equal portions 21, 22 along a line orientated generally parallel to a longitudinal axis of the shaft 12. Each of the portions has a pair of free edges 23, 24. A first free edge 23 of a first portion 21 is hingedly coupled to a first free edge 23 of the second portion 22 such that the second free edges 24 are abuttable. A closed position is defined by the second free edges 24 being abutted. The shaft 12 has a generally rectangular shape. When divided, the two portions 21, 22 each generally have U-shaped cross-sections taken traverse to the longitudinal axis of the shaft 12. The width and height of the shaft is at least 3 inches. The shaft preferably comprises a metal, and preferably has a length greater than twelve inches.

A latching means removably latches the first portion to the second portion such that the free ends of each are abutted. The latching means includes a pair of loops 26, 28. Each of the loops 26, 28 has a pair of free ends. Each of the free ends of the loops 26, 28 is integrally coupled to one of the portions 21, 22 of the shaft 12. The loops 26, 28 are coupled to the outer surface 20 of the portions 21, 22. Each of the loops 26, 28 is positioned generally adjacent to the second free edges 24 of the portions, and each of the loops is located such that the loops are generally adjacent to each other when the portions 21, 22 are in the closed position. A first of the loops 26 is angled toward the first end 14 of the shaft 12 and a second 28 of the loops is angled toward the second end 16 of the shaft 12. Each of the loops comprises a metal.

A locking means 30 removably locks the loops together. Ideally, the locking means 30 comprises a padlock though any type of suitable lock may be used.

Figure 4:
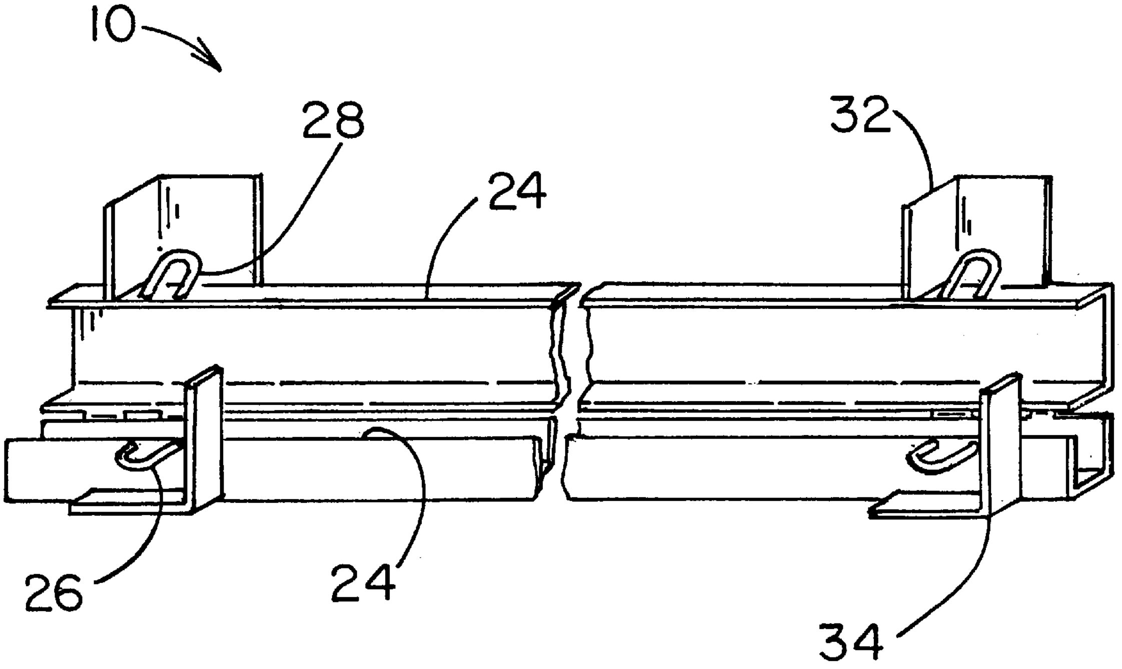
FIG. 4 is a schematic perspective view of the present invention.
Figure 5:
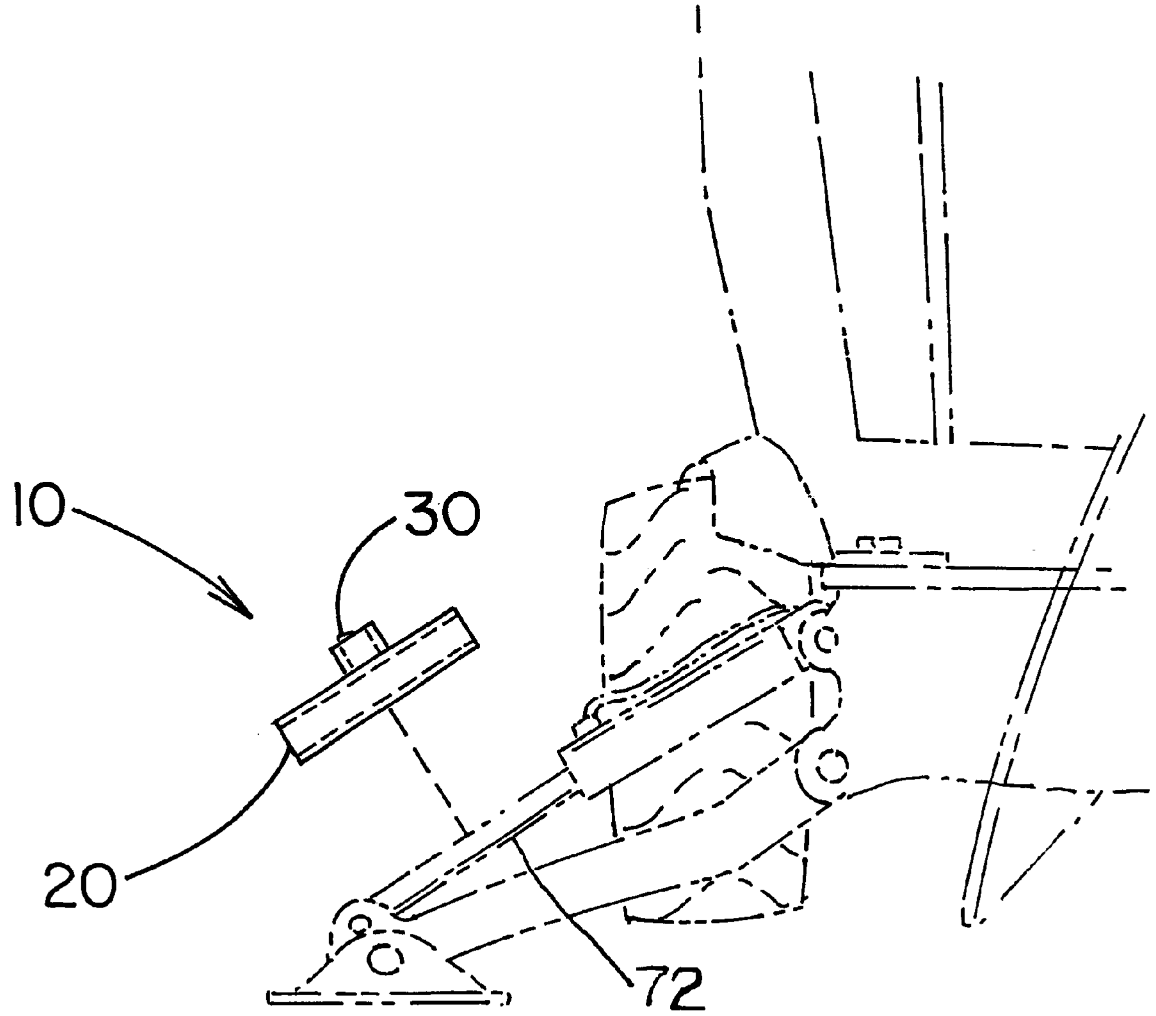
FIG. 5 is a schematic perspective view of a new anti-theft device according to the present invention.

A shield assembly shields the pair of loops to prevent tapering with the loops or the locking means. The shield assembly comprises a pair of walls 32, 34. Each of the walls 32, 34 is integrally coupled to one of the portions 21, 22 of the shaft 12. Each of the walls 32, 34 is angled to encircle a portion of the loops 26, 28. Each of the walls 32, 34 is positioned such that the walls define a housing around the loops when the portions 21, 22 are in the closed position as shown in FIG. 1. The walls 32, 34 each extend beyond an associated free edge, previously referred to the second edges 24, of a portion of the shaft 12 to abut the other of the walls in the closed position. The walls 32, 34 may each be arced walls or may be each comprised of a pair of vertical planar members orientated generally perpendicular to each other as shown in FIG. 2. Longer embodiments may have multiple latching means as is shown in FIG. 4.

In use, the shaft 12 is opened to place the cylinder 72 of the leg 70 into the shaft 12 when the cylinder 72 is in an extended position. The shaft 12 is then closed such that the loops 26, 28 are adjacent to each other so that they may receive the locking means 30. The locking means 30 is run through the loops 26, 28 and locked to that the shaft 12 may not be removed from the cylinder 72 and the cylinder 72 may not be retracted.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An anti-theft device for heavy machinery, said device being removably coupled around an extended cylinder of a stabilizing leg of said machinery such that the stabilizing leg may not be retracted, wherein said wheels on said machinery may not utilized, said device comprising:

a shaft, said shaft being elongate and having a first and second ends, said shaft being hollow such that said shaft has an inner surface and an outer surface, each of said first and second ends being open, said shaft being divided into two portions along a line orientated generally parallel to a longitudinal axis of said shaft, each of said portions having a pair of free edges, a first free edge of a first portion being pivotally coupled to a first free edge of said second portion such that said second free edges are abuttable, said first and second portions being movable between open and closed positions, said closed position being defined by said second free edges being abutted;

a latching means coupled to said shaft for removably latching said first portion to said second portion in said closed position, said latching means including;

a pair of loops, each of said loops being generally U-shaped and defining an interior of said loop, each of said loops being integrally coupled to one of said portions of said shaft, each of said loops being positioned generally adjacent to said second free edges of said portions, each of said loops being positioned on said portions such that said loops are generally adjacent to each other and at least a portion of the interiors or said loops are in registration with each other when said portions are in said closed position; and a shield assembly mounted on said shaft and surrounding said pair of loops for shielding a lock when a shackle of the lock is looped through said loops, said shield assembly comprises a pair of wall structures, each of said wall structures comprising a pair of walls orientated substantially perpendicular to each other, outer edges of said wall structures defining an opening for receiving the lock, each of said walls being integrally coupled to one of said portions of said shaft, each of said walls being angled to extend about a portion of said loops, each of said walls being positioned such that said walls define a housing around said loops when said portions are in said closed position;

wherein a portion of one of said walls of each said wall structure extends over the outer surface of the portion of the shaft having the other said wall structure mounted thereon for blocking outward movement of the second free edge of that portion of said shaft.

2. The anti-theft device as in claim 1, wherein a first one of said loops is angled toward said first end of said shaft and a second one of said loops is angled toward said second end of said shaft.

3. The anti-theft device as in claim 1, further comprising a plurality of latching means.

4. An anti-theft device for heavy machinery, said device being removably coupled around an extended cylinder of a stabilizing leg of said machinery such that the stabilizing leg may not be retracted, wherein said wheels on said machinery may not utilized, said device comprising:

a shaft, said shaft being elongate and having a first and second end, said shaft being hollow such that said shaft has an inner surface and an outer surface, each of said first and second ends being open, said shaft being divided into two substantially equal portions along a line orientated generally parallel to a longitudinal axis of said shaft, each of said portions having a pair of free edges, a first free edge of a first portion being hingedly coupled to a first free edge of said second portion such that said second free edges are abuttable, a closed position being defined by said second free edges being abutted, said shaft having a generally rectangular shape, said shaft comprising a metal, said shaft having a length greater than twelve inches, a latching means for removably latching said first portion to said second portion, said latching means comprising:

a pair of loops, each of said loops having a pair of free ends, each of said free ends of said loops being integrally coupled to one of said portions of said shaft, said loops being coupled to said outer surface of said portions, each of said loops being positioned generally adjacent to said second free edges of said portions, each of said loops being located such that said loops are generally adjacent to each other when said portions are in said closed position, a first of said loops being angled toward said first end of said shaft and a second of said loops being angled toward said second end of said shaft, each of said loops comprising a metal;

a locking means for removably locking said loops together, said locking means comprising a padlock; and a shield assembly for shielding said pair of loops, said shield assembly comprises a pair of walls, each of said walls being integrally coupled to one of said portions of said shaft, each of said walls being angled to extend about a portion of said loops, each of said walls being positioned such that said walls define a housing around said loops when said portions are in said closed position, each of said walls extending beyond an associated free edge of a portion of said shaft to abut the other of said walls in said closed position;

wherein a portion of one of said walls of each said wall structure extends over the outer surface of the portion of the shaft having the other said wall structure mounted thereon for blocking outward movement of the second free edge of that portion of said shaft.

5. An anti-theft device for heavy machinery, said device being removably coupled around an extended cylinder of a stabilizing leg of said machinery such that the stabilizing leg may not be retracted, wherein said wheels on said machinery may not utilized, said device comprising:

a shaft, said shaft being elongate and having a first and second end, said shaft being hollow such that said shaft has an inner surface and an outer surface, each of said first and second ends being open, said shaft being divided into two substantially equal portions along a line orientated generally parallel to a longitudinal axis of said shaft, each of said portions having a pair of free edges, a first free edge of a first portion being hingedly coupled to a first free edge of said second portion such that said second free edges are abuttable, a closed position being defined by said second free edges being abutted;

a latching means coupled to said shaft for removably latching said first portion to said second portion in said closed position; and a shield assembly for shielding said latching means, said shield assembly comprises a pair of walls, each of said walls being integrally coupled to one of said portions of said shaft, each of said walls being positioned such that said walls define a housing around said latching means when said portions are in said closed position;

wherein a portion of one of said walls of each said wall structure extends over the outer surface of the portion of the shaft having the other said wall structure mounted thereon for blocking outward movement of the second free edge of that portion of said shaft.

6. The anti-theft device as in claim 1, wherein a cantilevered portion of one of said walls of each of said wall structures extends beyond the second free edge of said portion on which said cantilevered portion is mounted to extend over the second free edge of the portions when said shaft is in said closed position.

* * * * *